(12) United States Patent
Walls et al.

(10) Patent No.: US 11,069,121 B2
(45) Date of Patent: Jul. 20, 2021

(54) METHODS, DEVICES AND COMPUTER PROGRAM PRODUCTS FOR CREATING TEXTURED 3D IMAGES

(71) Applicant: SONY CORPORATION, Tokyo (JP)

(72) Inventors: Mattias Walls, Häljarp (SE); Johannes Elg, Helsingborg (SE); Fredrik Mattisson, Lund (SE); Fredrik Olofsson, Lund (SE); Lars Novak, Bjärred (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/635,512

(22) PCT Filed: Aug. 31, 2017

(86) PCT No.: PCT/US2017/049587
§ 371 (c)(1),
(2) Date: Jan. 30, 2020

(87) PCT Pub. No.: WO2019/045725
PCT Pub. Date: Mar. 7, 2019

(65) Prior Publication Data
US 2020/0160586 A1 May 21, 2020

(51) Int. Cl.
*G06T 15/04* (2011.01)
*G06T 15/20* (2011.01)
*G06T 15/80* (2011.01)
*G06K 9/00* (2006.01)

(52) U.S. Cl.
CPC .......... *G06T 15/04* (2013.01); *G06K 9/00275* (2013.01); *G06K 9/00281* (2013.01); *G06T 15/205* (2013.01); *G06T 15/80* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,436,853 B1* | 5/2013 | Hickman | ................. | G06T 7/55 345/419 |
| 10,565,731 B1* | 2/2020 | Reddy | ....................... | G06T 7/75 |
| 2010/0295854 A1* | 11/2010 | Miller | ................ | G06K 9/00208 345/427 |

(Continued)

OTHER PUBLICATIONS

International Search Report and Written Opinion of the International Searching Authority, International Application No. PCT/US2017/049587, dated Oct. 17, 2017, 15 pp.

(Continued)

*Primary Examiner* — Wesner Sajous
(74) *Attorney, Agent, or Firm* — Myers Bigel, P.A.

(57) ABSTRACT

A method for creating a 3D image is described. The method includes receiving a plurality of 2D images of an object, identifying respective 2D positions of one or more features in each of the plurality of 2D images, generating a 3D representation of the object, based on the respective 2D positions of the one or more features in each of the plurality of 2D images, and determining a 3D angular orientation of the 3D representation of the object based on relative positions of the one or more features in the 3D representation of the object. Related systems, devices and computer program products are also described.

18 Claims, 11 Drawing Sheets

(56) References Cited

U.S. PATENT DOCUMENTS

| | | | |
|---|---|---|---|
| 2013/0208948 A1* | 8/2013 | Berkovich | G06T 7/579 |
| | | | 382/103 |
| 2018/0338128 A1* | 11/2018 | Trevor | H04N 5/23219 |
| 2019/0251744 A1* | 8/2019 | Flagg | G06T 17/10 |

OTHER PUBLICATIONS

Vatahska et al., "Feature-based Head Pose Estimation from Images", 2007 7th IEEE-RAS International Conference on Humanoid Robots, Pittsburgh, PA, Nov. 29-Dec. 1, 2007, pp. 330-335.

Muratov et al., "3DCapture: 3D Reconstruction for a Smartphone", 2016 IEEE Conference on Computer Vision and Pattern Recognition Workshops (CVPRW), Las Vegas, NV, Jun. 26-Jul. 1, 2016, pp. 893-900.

* cited by examiner

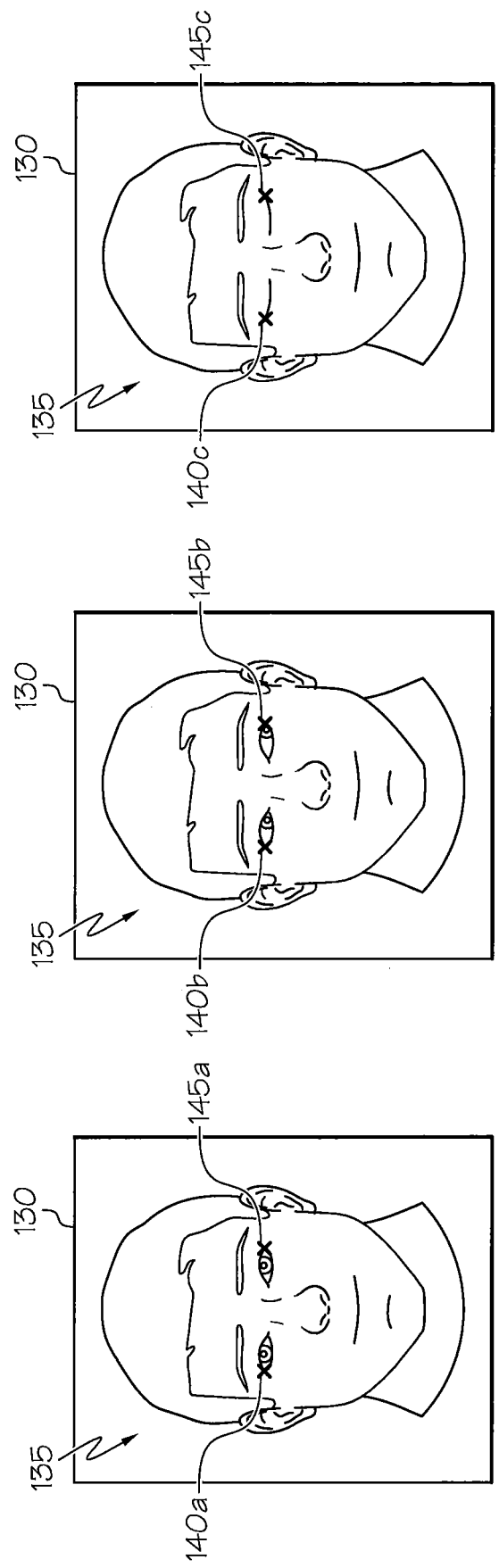

METHODS, DEVICES AND COMPUTER PROGRAM PRODUCTS FOR CREATING TEXTURED 3D IMAGES

CROSS REFERENCE TO RELATED APPLICATION

This application is a 35 U.S.C. § 371 national stage application of PCT International Application No. PCT/US2017/049587, filed on Aug. 31, 2017, the content of which is incorporated herein by reference in its entirety. The above-referenced PCT International Application was published in the English language as International Publication No. WO 2019/045725 A1 on Mar. 7, 2019.

FIELD

Various embodiments described herein relate to methods and devices for image processing and more particularly to creating 3D images.

BACKGROUND

Simultaneous Localization and Mapping (SLAM) relates to constructing or updating a map or an image while a user's location is non-static in the environment. In mono-camera systems, image-based positioning algorithms may use SLAM techniques to create three-dimensional (3D) images for augmented reality, 3D printing, 3D model development, and other applications. An important part of using SLAM techniques is the baseline initialization of an inferred 3D image from Two-Dimensional (2D) images. By inferring the 3D image from the 2D images, SLAM techniques can generate a 3D model from a series of 2D images, which can allow the generation of a 3D model from a series of scanned images.

The various 2D images may be of differing quality, where some 2D images are blurrier than others. Additionally, if the 2D images are of a person's face, the person may be looking in different directions in some of the 2D images. As such, there is a need for improved generation of 3D models that handles 2D images of varying levels of quality and offset of facial features.

SUMMARY

Various embodiments described herein provide a method for processing Two-Dimensional, 2D, images, to create Three-Dimensional, 3D, images. The method includes receiving a plurality of 2D images of an object, identifying respective 2D positions of one or more features in each of the plurality of 2D images, generating a 3D representation of the object, based on the respective 2D positions of the one or more features in each of the plurality of 2D images, and determining a 3D angular orientation of the 3D representation of the object based on relative positions of the one or more features in the 3D representation of the object.

According to some embodiments, the method may include determining respective 2D angular orientations of the object in each of the plurality of 2D images, ranking the plurality of 2D images based on the respective 2D angular orientations, selecting a 2D image out of the plurality of 2D images, based on the ranking the plurality of 2D images, and generating a texture of the 3D representation of the object based on the 2D image that was selected. The texture of the 3D image includes features that are aligned with one another.

According to some embodiments, determining respective 2D angular orientations of the object in each of the plurality of 2D images may include determining the respective 2D angular orientations of the object based on the respective 2D positions of at least two of the one or more features in each of the plurality of 2D images. Determining respective 2D angular orientations of the object in each of the plurality of 2D images may further include determining the respective 2D angular orientations of the object based on identification of the object based on the one or more features in one or more of the plurality of 2D images. The object may include a face of a person, such that a first feature of the one or more features includes a first eye of the person, and a second feature of the one or more features includes a second eye of the person. Selecting the 2D image out of the plurality of 2D images includes selecting the 2D image such that both the first eye and the second eye are in an open position. Generating the texture of the 3D representation of the object includes the first eye and the second eye looking in a same direction based on a single one of the plurality of 2D images that includes the 2D image that was selected.

According to some embodiments, ranking the plurality of 2D images based on the respective 2D angular orientations may include ranking the plurality of 2D images in an order based on the respective 2D angular orientations. A first 2D image includes the respective 2D angular orientation being a substantially perpendicular view of the object and a last 2D image includes the respective 2D angular orientation being the least perpendicular view of the object. The method may include generating the texture of the 3D image, responsive to determining that two or more 2D images of the plurality of 2D images have the respective 2D angular orientation being the substantially perpendicular view of the object.

According to some embodiments, the texture may include shading and/or coloring based on the 2D image out of the plurality of 2D images that was selected. Generating the 3D representation of the object may include generating the 3D representation of the object based on respective image capture positional information associated with each of the 2D images.

According to some embodiments, determining the 3D angular orientation of the 3D representation of the object includes determining a cross product of two vectors, and determining the 3D angular orientation of the 3D representation of the object based on the cross product of the two vectors. The first vector of the two vectors may include a difference between a first feature point 3D coordinate of a first feature of the one or more features in the 3D representation of the object and a second feature point 3D coordinate of a second feature of the one or more features in the 3D representation of the object. The second vector of the two vectors comprises a difference between the first feature point 3D coordinate of the first feature of the one or more features in the 3D representation of the object and a third feature point 3D coordinate of a third feature of the one or more features in the 3D representation of the object. Determining the 3D angular orientation of the 3D representation of the object based on the cross product of the two vectors may further include determining a plane that is a midpoint between the first feature and the second feature, determining a normal vector to the plane, and applying a tilt to the cross product of the two vectors by rotating around the normal vector.

Various embodiments described herein can provide an image processing system for processing images. The image processing system includes a processor and a memory coupled to the processor and storing computer readable program code that when executed by the processor causes the processor to perform operations including receiving a plurality of 2D images of an object, identifying respective 2D positions of one or more features in each of the plurality of 2D images, generating a 3D representation of the object, based on the respective 2D positions of the one or more features in each of the plurality of 2D images, and determining a 3D angular orientation of the 3D representation of the object based on relative positions of the one or more features in the 3D representation of the object.

Various embodiments described herein can provide a computer program product for operating an image capturing system, the computer program product including a non-transitory computer readable storage medium having computer readable program code embodied in the medium that when executed by a processor causes the processor to perform operations including any of the method steps described above. In some embodiments, the computer program product including a non-transitory computer readable storage medium having computer readable program code embodied in the medium that when executed by a processor causes the processor to perform any combination of operations of any of the method steps.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

FIGS. 2A to 2C and 3A to 3C illustrate Two Dimensional (2D) images of a face, according to various embodiments described herein.

DETAILED DESCRIPTION

Figure 1:
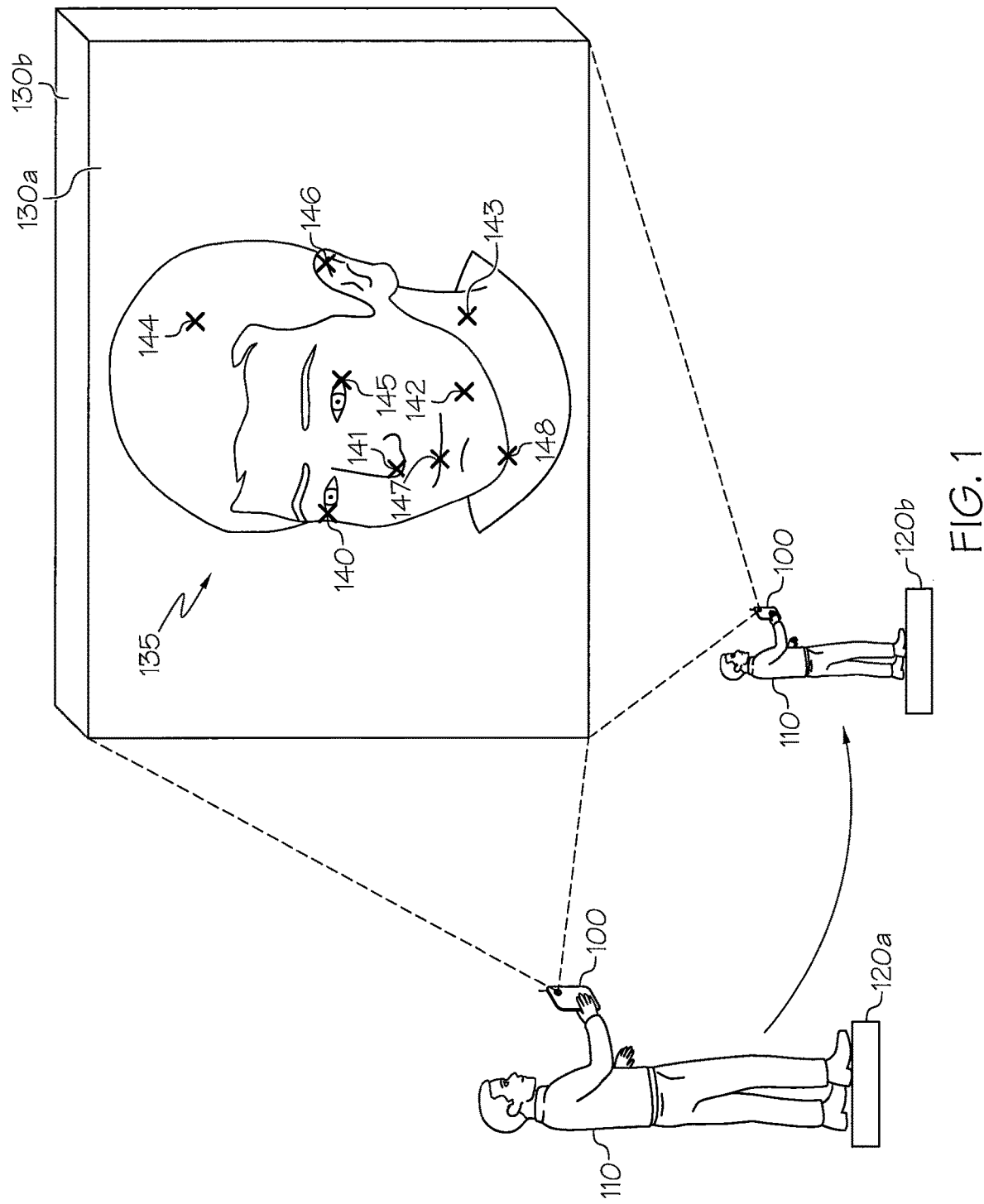
FIG. 1 illustrates a user taking pictures with a camera, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Applications such as 3D imaging, mapping, and navigation use Simultaneous Localization and Mapping (SLAM). SLAM relates to constructing or updating a map of an unknown environment while simultaneously keeping track of an object's location within it. This computational problem is recognized to be a chicken-and-egg problem since the object may be moving and the environment may be changing. 2D images of real objects may be captured with the objective of creating a 3D image that is used in real-world applications such as augmented reality, 3D printing, or 3D visualization with different perspectives of the real objects.

The 3D objects may be characterized by features that are specific locations on the physical object in the 2D images that are of importance for the 3D representation such as corners, edges, center points, or object-specific features on a physical object such as a face that may include nose, ears, eyes, mouth, etc. There are several algorithms used for solving this computational problem associated with 3D imaging, using approximations in tractable time for certain environments. Popular approximate solution methods include the particle filter and Extended Kalman Filter (EKF). The particle filter, also known as a Sequential Monte Carlo (SMC) linearizes probabilistic estimates of data points. The Extended Kalman Filter is used in non-linear state estimation in applications including navigation systems such as Global Positioning Systems (GPS), self-driving cars, unmanned aerial vehicles, autonomous underwater vehicles, planetary rovers, newly emerging domestic robots, medical devices inside the human body, and image processing systems. Image processing systems may perform 3D pose estimation using SLAM techniques by performing a transformation of an object in a 2D image to produce a 3D object. However, existing techniques such as SMC and EKF may be insufficient in accurately estimating and positioning various points in a 3D object based on information discerned from 2D objects.

Various embodiments described herein may arise from the recognition that there may be slight differences or variations in 2D images of an object such as a face that provide challenges when generating a 3D representation of the object. Features of the object such as the eyes on the face may differ if the person blinks between frames or changes the direction of their glance. Moreover, the quality of each of the frames of 2D images may vary. For example, environmental conditions such as amount of light, reflections, etc. may change the quality of the image such that the image may be blurry or dark. These differences present challenges when texturing the 3D representation of the object. Various embodiments described herein can provide solutions to improve the 3D representation of the object by determining the direction of orientation of the object, such as, for example, the direction that a face is looking as well as selecting 2D images for use based on proper feature state, such as, for example, the eyes of a person being open.

2D images may be obtained using image sensors. Image sensors may be collocated with or integrated with a camera, such as a camera in a mobile device. The terms "image sensor", "image capturing system" and "camera" will be used herein interchangeably. The camera may be implemented with integrated hardware and/or software as part of an electronic device, or as a separate device. Types of cameras may include mobile phone cameras, security cameras, wide-angle cameras, narrow-angle cameras, and/or monoscopic cameras.

FIG. 1 illustrates a user taking pictures with a camera at various locations around the object. Although the foregoing examples discuss the images acquired from a camera, the images that are processed may be previously residing in memory or the images be sent to the processing unit for processing according to various embodiments described herein. Furthermore, a face of a person is discussed herein as an example object, but the techniques described herein may apply to any object for which a 2D image can be acquired. Referring now to FIG. 1, a user 110 has a camera 100 for which that they initiate a photographic session of an object 135, such as a person's face, at location 120a. The user 110 may physically move around the object 135 to various locations such as from location 120a to location 120*b*. An image 130 of object 135 is captured at each location. For example, image 130*a* is captured when the camera 100 is at location 120*a* and image 130*b* is captured when camera 100 moves to location 120*b*. Each of the captured images may be 2D images. There may be a continuous flow of images from the camera as the user walks around the object 135 that is being photographed to capture images at various angles. Once at least two images, such as images 130*a* and 130*b* are captured, the images may be processed by a processor in camera 100 or a processor external to the camera 100 to generate a 3D representation or 3D image. Generation of the 3D representation may occur after at least the first two images are captured. The quality of the 3D model may not be satisfactory if too few 2D images are used. If the quality of the 3D model is not sufficient, further processing of additional images may take place. Information from the 3D image may be used to generate a 3D image that may include texturing such as grey scale shading and/or coloring, which may be subsequently provided for display on a display device and/or screen.

The images may be processed by identifying features on the object 135 that were captured in the first image 130*a* and/or second image 130*b*. The feature points may be various edges, corners, or other points on object 135 or object-specific features such as eyes 140,145, nose 141, dimple 142, neck 143, hair 144, ear 146, mouth 147, and/or chin 148. The features are recognizable locations on the physical object that are tracked in various images of the physical object. When the user 110 moves the camera 100 to a different location 120*b*, another image 130*b* is captured. This same process of capturing images and identifying features may occur on the order of tens, hundreds, or thousands of times in the context of creating a 3D image. The same features 140 through 148 may be identified in the second image 130*b*. An X-Y coordinate system may be used to quantify the location of features 140 through 148. Continuing with the foregoing example of a person's face, differences in the facial features and facial orientation will now be discussed with respect to FIGS. 2A to 2C and/or FIGS. 3A to 3B.

FIGS. 2A to 2C illustrate a person's face that is looking straight at the camera. In other words, a perpendicular view of the face is illustrated. Referring now to FIG. 2A, the face is oriented straight at the camera, which both eyes completely open and looking straight at the camera. Referring now to FIG. 2B, the face is oriented straight at the camera with both eyes open, but the eyes are glancing to the side. Referring now to FIG. 2C, the face is oriented straight at the camera, but both eyes are closed. These 2D images of FIGS. 2A to 2C have the same angular orientation of the face, but differences in the eye features. Techniques to process these 2D images based on the inventive concept will be discussed.

Figure 3C:
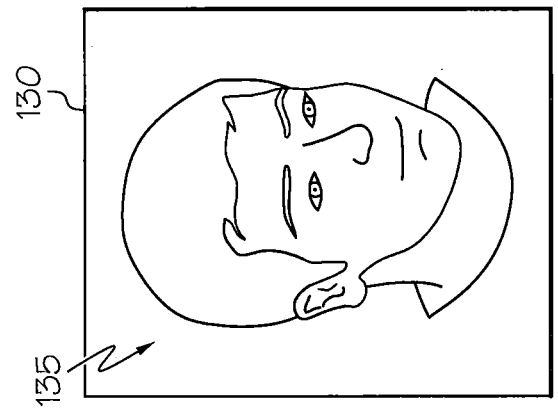
Figure 3B:
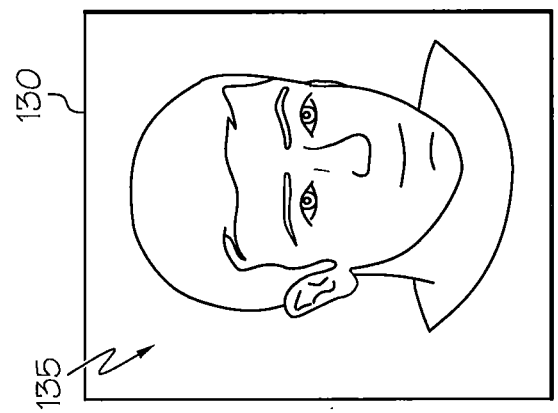
Figure 3A:
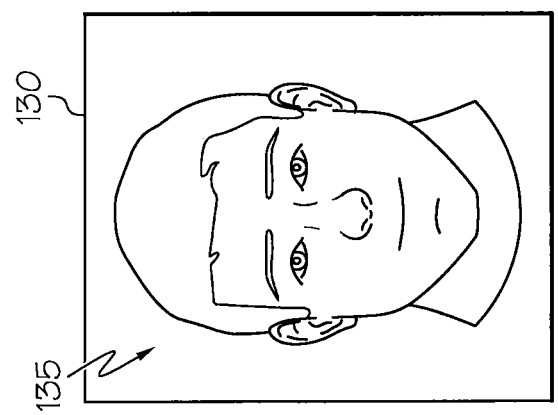

FIGS. 3A to 3C illustrate a person's face that is oriented in various directions. Referring now to FIG. 3A, the face is oriented straight at the camera. Referring now to FIG. 3B, the face is offset from the perpendicular by about 30 degrees. Referring now to FIG. 3C, the face is offset from the perpendicular by about 45 degrees. Techniques to process these various facial angular orientations of the 2D images will now be discussed.

Figure 4:
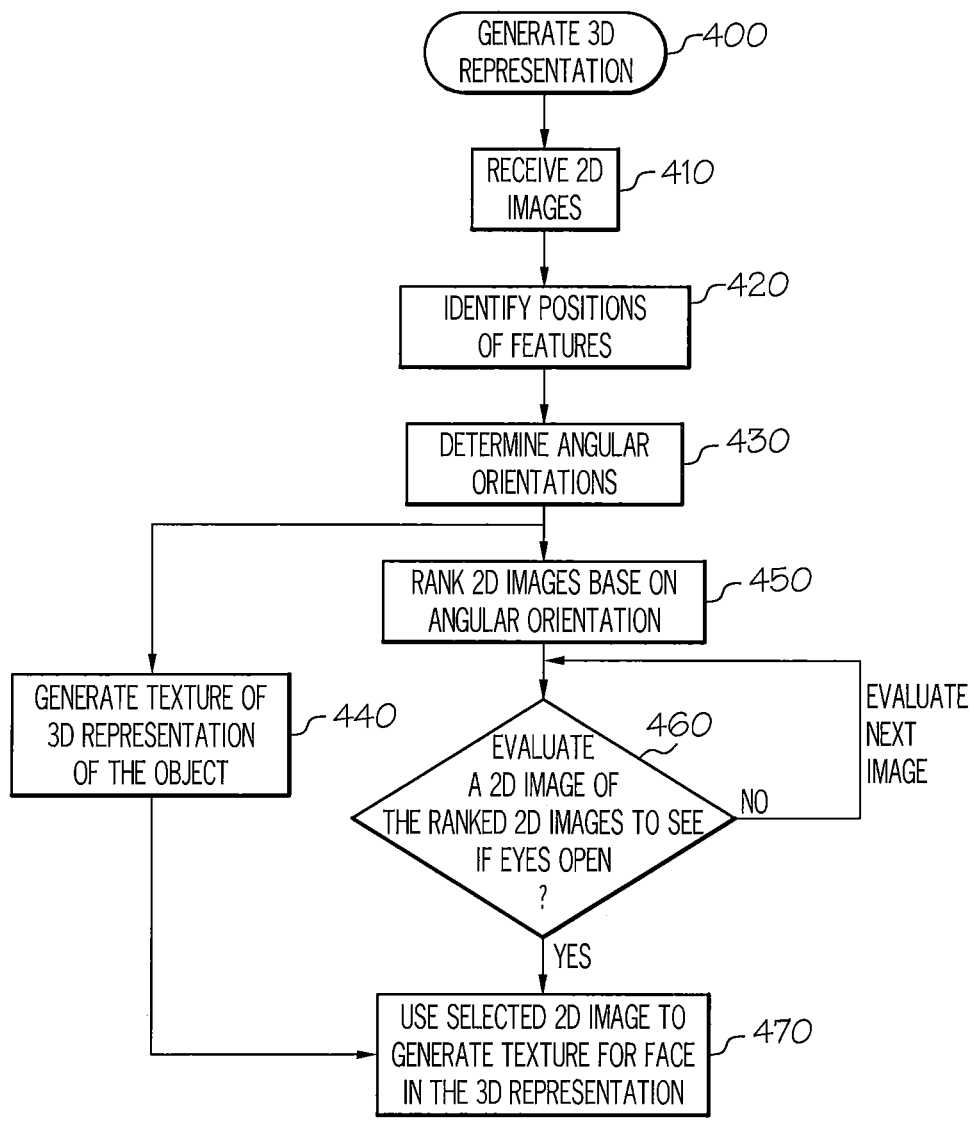
FIG. 4 is a flowchart of operations to generate a textured 3D representation, according to various embodiments described herein.

FIG. 4 is a flowchart of operations to process 2D images to generate a 3D image. Referring now to FIG. 4, it may be necessary to generate a 3D representation, at block 400. 2D images 130 of FIG. 1 are received at block 410. Features of the object in the 2D images and/or the positions of the features are identified at block 420. For example, if the object is a face as illustrated in FIG. 1, one or more features 140 through 148 of FIG. 1 may be identified. These features may include distinguishable characteristics of the person such as the eyes, nose, mouth, chin, ear, etc. If the object is a car, for example, the features may include a corner of the bumper, a side-view mirror, door, spoiler, etc. of the car.

Still referring to FIG. 4, the angular orientation of the object may be determined, at block 430. For a face, it may be known that the perpendicular view of the face that is directly facing the camera may be the baseline orientation. Based on this baseline orientation of the face, an angular orientation with respect to the baseline orientation may be determined. For example, FIGS. 3B and 3C illustrate faces that are at angular orientations of approximately 30 degrees and 45 degrees, respectively. A full profile view would have an angular orientation of 90 degrees. Based on these various angular orientations, a texture of the object in the 3D representation of the object may be generated, at block 440.

In some images, further processing may be optionally occur to improve the image based on a goal of having the eyes open if the object is a face of a person. Still referring to FIG. 4, the 2D images may be ranked based on an order based on the determined angular orientations, at block 450. For example, one or more 2D images with the face in a perpendicular view, such as in FIG. 3A may be ranked first. Other images may be ranked in order of the difference in angular orientation from the perpendicular view. For example, the example facial images would be ranked in the order of FIGS. 3A, 3B, and then 3C, since FIG. 3C is further in angular orientation from the perpendicular view of FIG. 3A. A specific feature of the ranked images may be evaluated for a desirable characteristic. For example, the ranked images may be evaluated in order to find a 2D image that has the eyes open, at block 460. If no 2D images with the eyes open are found, an image with the eyes being substantially open may be selected. In some embodiments, further evaluation such as to see if the eyes are directly facing the camera or if the quality of the image is suitable may also occur. An image out of the ranked images is thus selected to generate the texture for the face in the 3D representation, at block 470. Blocks 450, 460, and 470 may be optional and/or occur in conjunction with block 440. Moreover, processing of the steps in the flowchart of FIG. 4 may occur in any order and some steps may occur concurrently and/or overlapping in time with one another. For example, the receiving of 2D images of block 410 and the identifying the positions of features of 420 may be occurring at the same time for different 2D images.

Figure 5:
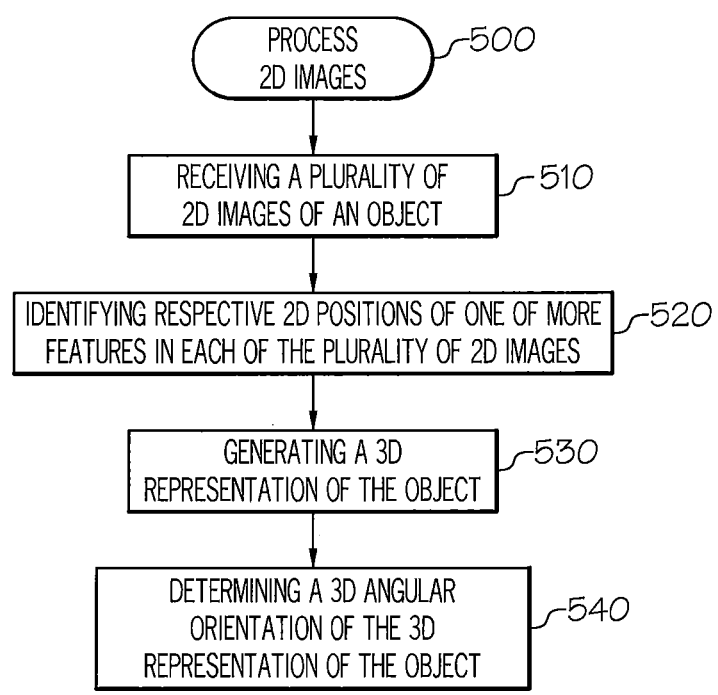
FIGS. 5 to 14 are flowcharts of operations for creating 3D images, according to various embodiments described herein.

FIG. 5 is a flowchart of operations for processing 2D images. Referring now to FIG. 5, a camera or image capture system may capture a series of 2D images, such as images 130 of FIGS. 1 to 3C, that are processed at block 500 of FIG. 5. The user may trigger the capture of the 2D images from the camera. Multiple 2D images, may be captured and processed as described herein. In some embodiments, multiple 2D images may have been previously captured and stored either in the camera or in memory associated with the camera. The images may be stored in the camera location or in a location that is remotely accessible across a network. A plurality of 2-D images of an object may be received at block 510. These images may be received from an image sensor or camera or may be received as images stored in an appropriate data format. The respective 2-D positions of one or more features in each of the plurality of 2-D images may be identified, at block 520. These features may be specific to the type of object in the images. For example, a library may be used to identify faces. The library may include software that enable face detection on 2D images and/or include a database that stores various facial images and/or related coordinates, or distilled data based on real facial images. The library may be used, according to embodiment described herein to identify a face and/or the features of the face in a 2D image. For example, a 2-D image of a face may be provided to a library that returns a set of 2D coordinates which outlined the face and face features in the picture. As previously discussed, these features may include the nose, eyes, ears, or other distinctions on the head of a person.

Still referring to FIG. 5, a 3-D representation and/or a texturing of the 3-D representation of the object may be generated, at block 530. The 3-D representation of the object may include a map, structure, or mesh that corresponds to the object. A 3-D angular orientation of the 3-D representation of the object may be determined, at block 540. Continuing with the ongoing example, if the object is the face of a person, the angular orientation represents the direction that the face is looking. In other words, the angular orientation may be quantified as an angle from forward facing directly into the camera. In some embodiments, the determination of the 3D angular orientation at block 540 may occur before generation of the 3D representation and/or generation of texturing of the 3-D representation of the object, at block 530.

Figure 6:
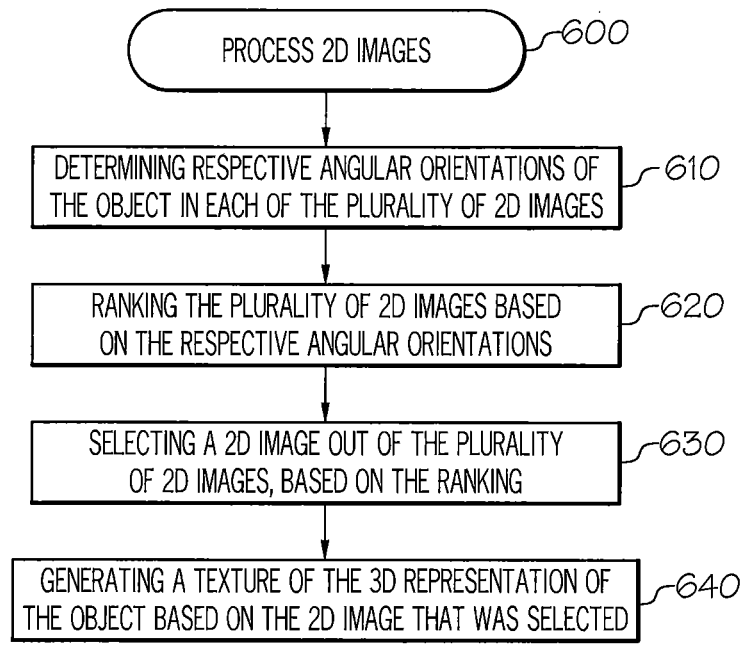

FIG. 6 is a flow chart of operations for further processing 2-D images such as at block 400 of FIG. 4 or at block 500 of FIG. 5. Referring now to FIG. 6, 2D images may be further processed, at block 600. Respective 2D angular orientations of the object may be determined for each of the plurality of 2-D images, at blocks 610, which may correspond to block 430 of FIG. 4. The 2D angular orientation may be an estimate of the object's direction in 3D space, as it was captured in the 2D image. In other words, the 2D angular orientation may be between the camera and the object in 3D space, as represented in the 2D image. The plurality of 2-D images may be ranked based on the respective angular orientations, at block 620. This operation may correspond to block 450 a FIG. 4. A 2-D image out of the plurality of 2-D images may be selected based on the ranking, at block 630. A texture of the 3-D representation of the object may be generated based on the 2-D image that was selected, a block 640. In the ongoing example of a face of FIGS. 3A to 3C, the face's direction may need to be determined in 3D space. The position of the face in 3D space may be relevant as well to be sure the camera not only is looking in the right direction, but is actually in front of the face. Hence the images may be ranked as described, to aide in determining the angle between the camera and the object in 3D space. Each of the 2D images may have an angular orientation of the camera. Some of these may be used in determining the 3D orientation of the face. A person of skill in the art would understand that these techniques described herein may apply to a case where the camera may be static and the object moves around it.

Figure 7:
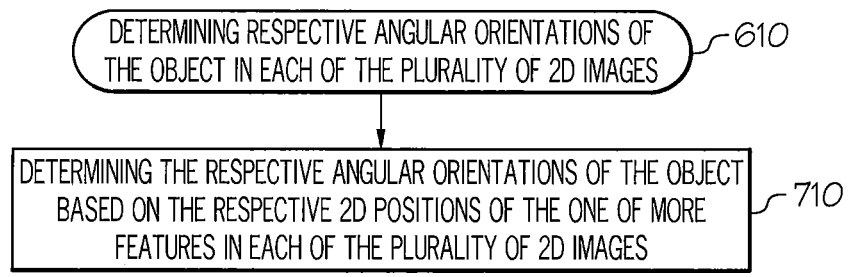

FIG. 7 is a flow chart of operations, according to some embodiments described herein. Referring now to FIG. 7, respected angular orientations of the object in each of the plurality of 2-D images may be determined based on the respective to the positions of one or more features in each of the plurality of 2-D images, at block 710. In the ongoing example, as illustrated in FIGS. 1 to 3C, the angular orientations may be based on facial features such as the eyes, nose, and/or mouth.

Figure 8:
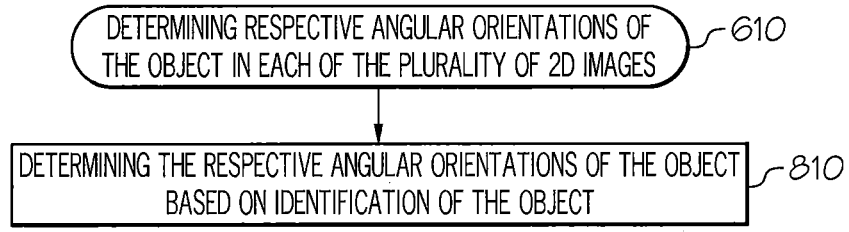

FIG. 8 is a flow chart of operations, according to some embodiments described herein. Referring now to FIG. 8, the respective angular orientations of the object may be determined based on identification of the object, at block 810. For example, in the images of FIGS. 1 to 3C, the object may be identified as a face, which indicates that the perpendicular view of the face, looking towards the camera, is the direction from which other angular orientations of the face may be measured. Likewise, if the object is identified as an automobile, the front view looking directly at the hood of the automobile may be the angle of view from which other angular orientations of the automobile may be measured. These baseline angular orientations are thus based on the recognition of the identifiable object for which there is a known baseline view from which other angular orientations may be measured.

Figure 9:
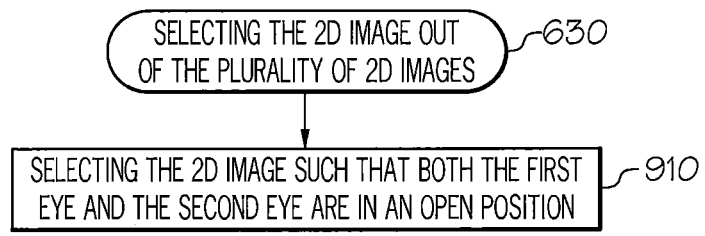

FIG. 9 is a flow chart of operations, according to some embodiments described herein. Referring now to FIG. 9, a 2D image may be selected such that both the first eye and the second eye are in an open position, at block 910. A first concern may be to find open eyes but an additional concern is to have the first eye and the second eye to be similar to one another. Consistency may be obtained from using both eyes from the same frame, regardless of if the eyes are open or not. In other words, although open eyes may be desired, consistency may also be obtained if both eyes are closed. This allows the resulting 3D representation to ensure that the eyes are consistent by representing both eyes based on the same 2D image. The entire model or 3D representation may be painted using a multitude of images, but only one of the images may be selected to determine the front of the face that meets criteria such as detecting that the object is a face, that the angle of the face is acceptable based on the face direction, and/or that both of the eyes are open. Some embodiments may use multiple images to provide a 3D representation of the front of the face. Since the facial features have been identified in 3D space, information pertaining to the facial features may be projected onto any of the 2D images, even if the entire face is not visible on that image, which would cause face detection to fail on that particular image. In some embodiments, an image with a close up of the eyes may be used to provide a high quality representation of the eyes in the 3D representation, while using a different 2D image for the representation of the mouth.

Figure 10:
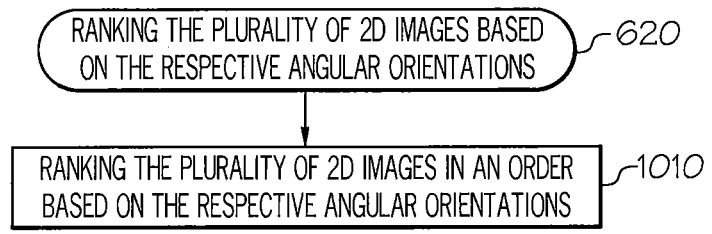

FIG. 10 is a flow chart of operations, according to some embodiments described herein. Referring now to FIG. 10, the plurality of 2-D images may be ranked in an order based on respective angular orientations, at block 1010. For example, as illustrated in FIGS. 3A to 3C, the images may be ranked in the order of FIG. 3A, followed by 3B, followed by 3C, since FIG. 3A has the face looking straight at the camera whereas FIG. 3C has the face with the greatest offset from the perpendicular.

Figure 11:
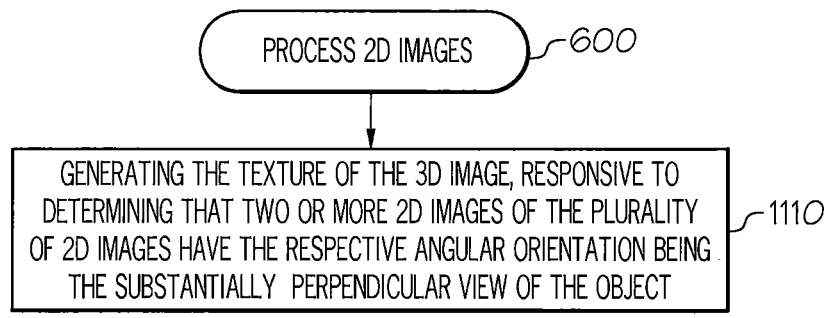

FIG. 11 is a flow chart of operations, according to some embodiments described herein. Referring now to FIG. 11, further processing of the 2D images of FIGS. 1 to 3C occurs at block 600. In some embodiments, the texture of the 3D image may be generated, at block 1110. This generating of the texture may occur responsive to determining that two or more 2D images of the plurality of 2D images have the respective angular orientation being the substantially perpendicular view of the object. In other words, two or more 2D images that are both substantially similar and suitable angular views may be used to generate the 3D representation. In some embodiments, two or more 2D images may be averaged to generate the texture of the 3D image.

Figure 12:
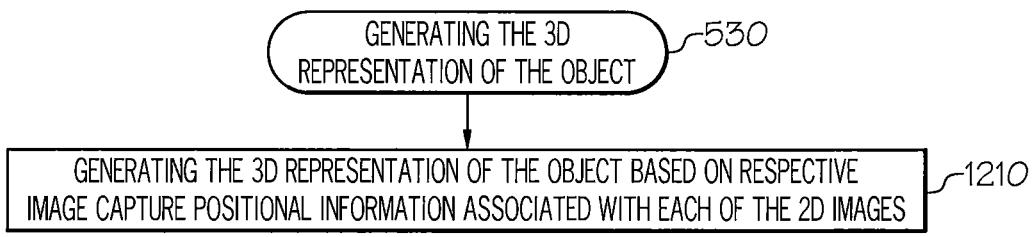

FIG. 12 is a flow chart of operations for generating the 3D representation of the object. Referring now to FIG. 12, generating the 3D representation of the object may be based on the respective image capture positional information associated with each of the 2D images, at block 1210. The image capture positional information may be discerned from the 2D image, be encoded by the camera at the time of capture of the image, or provided based on the location of the image sensor that generated the 2D image. This positional information that indicates the direction from which a 2D image of the object was obtained may be used to generate the 3D representation of the object.

Figure 13:
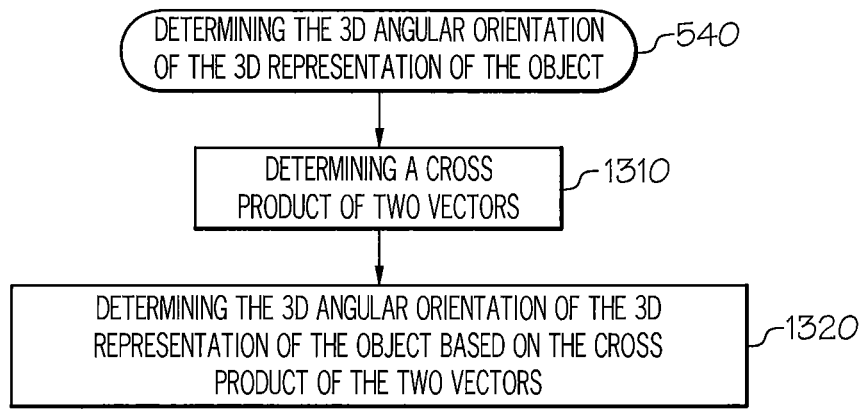

FIG. 13 is a flow chart of operations for determining the 3D angular orientation of the 3D representation of the object. Referring now to FIG. 13, a cross product of two vectors may be determined, at block 1310. The 3D angular orientation may be determined based on the cross product of the two vectors, at block 1320. The first vector of the two vectors may be based on a difference between a first feature point 3D coordinate of a first feature of the one or more features in the 3D representation of the object and a second feature point 3D coordinate of a second feature of the one or more features in the 3D representation of the object. In some embodiments, the first vector of the two vectors may be a difference between a first location of a first 3D feature point and a second location of a second feature point. The second vector of the two vectors may be based on a difference between the first feature point 3D coordinate of the first feature of the one or more features in the 3D representation of the object and a third feature point 3D coordinate of a third feature of the one or more features in the 3D representation of the object. In some embodiments, the second vector of the two vectors may be a difference between a third location of a third feature point and a fourth location of fourth feature point. The 3D angular orientation is based on the difference in 3D positions of the object in the two images. A properly triangulated feature may have one 3D coordinate. One vector may be the difference between a first feature point and a second feature point, and the second vector may be the difference between the first feature point and a third feature point. Specifically, the face direction or the orientation of the object may be determined by calculating a cross product between two vectors and slightly tilting the result. In the ongoing facial example, the vectors used are the deltas between the mouth center and the two eye centers in 3D-space. In some embodiments, the resulting vector is tilted slightly to compensate for the mouth being slightly "in front" of the eyes so the cross product vector may be pointing slightly upward compared to the nose. It is noted that when calculating the cross product, the order of the vectors is important. If the cross product is computed in the wrong order of vectors, the resulting vector may be pointing in towards the back of the head instead of in the same direction as the nose. To determine the correctional tilt, a plane is calculated that has the middle point between the two eyes, the center of the mouth and the center of the nose on it. The normal of that plane is determined such that the tilt is based on rotating around the normal of the plane.

Figure 14:
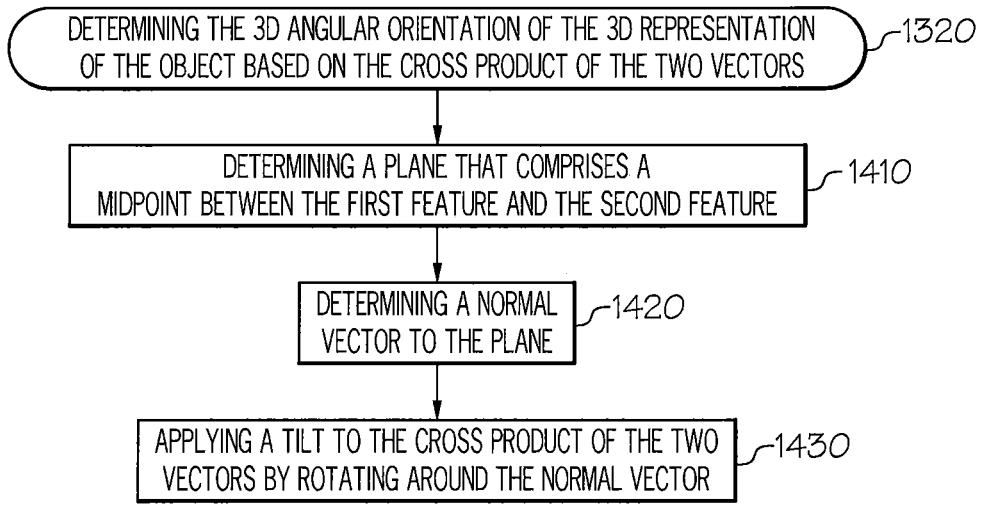

FIG. 14 is a flow chart of operations for determining the 3D angular orientation of the 3D representation of the object based on the cross product of two vectors, as in block 1320 of FIG. 13. Referring now to FIG. 14, a plane that comprises a midpoint between the first feature and the second feature may be determined, at block 1410. A normal vector to the plane may be determined, at block 1420. A tilt to the cross product of the two vectors may be applied by rotating around the normal vector, at block 1430.

Figure 15:
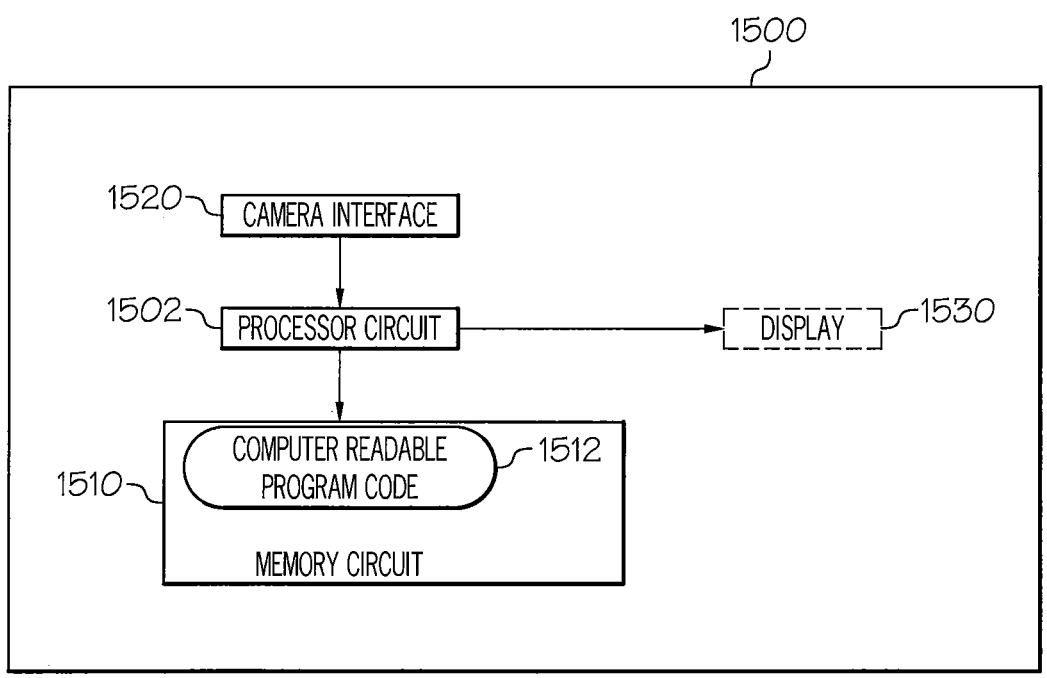
FIGS. 15 and 16 are block diagrams of wireless electronic devices, according to various embodiments described herein.

FIG. 15 is a block diagram of an image processing system 1500 of an electronic device, such as camera 100 of FIG. 1 in an image processing system. The image processing system 1500 may be integrated with the camera and/or may be external to the camera and is configured to perform operations according to one or more embodiments disclosed herein. Referring to FIG. 15, the image processing system 1500 includes a display circuit 1530, a processor circuit 1502, and a memory circuit 1510 containing computer readable program code 1512. The processor circuit 1502 may include one or more data processing circuits, such as a general purpose and/or special purpose processor, e.g., microprocessor and/or digital signal processor, that may be collocated or distributed across one or more networks. The processor circuit 1502 is configured to execute the computer readable program code 1512 in the memory 1510 to perform at least some of the operations and methods of described herein as being performed by the image processing module 1500. The camera interface 1520 is coupled to the processor circuit 1502 and may communicate with a server or other external network entity, directly or indirectly.

Figure 16:
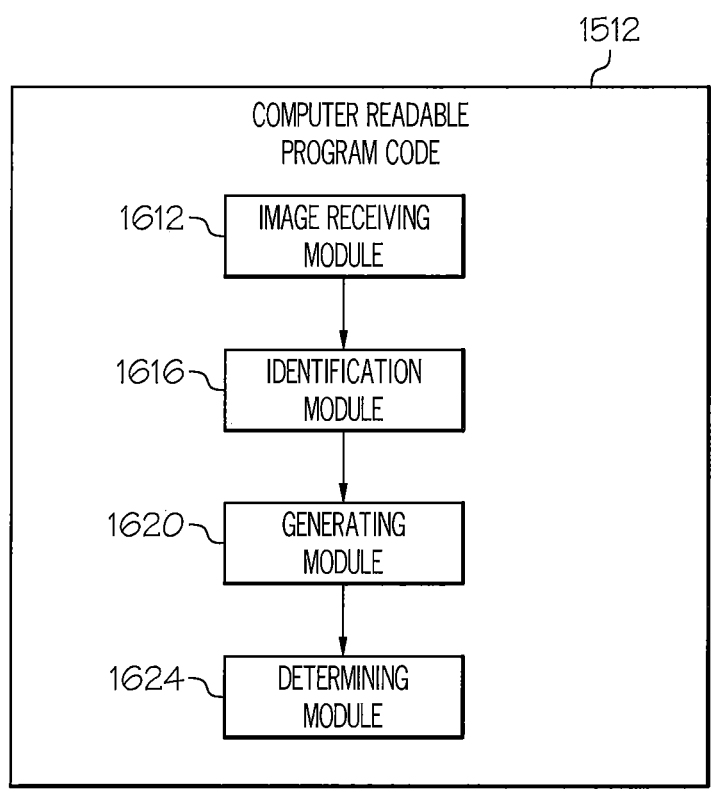

FIG. 16 illustrates modules for an image processing module that perform operations as disclosed herein according to some embodiments. The computer readable program code 1512 of FIG. 15 may include one or more modules. Referring now to FIG. 16, the computer readable program code 1512 may include an image receiving module 1612, an identification module 1616, a generating module 1620, and/or a determining module 1624. The image receiving module 1612 is for performing reception of 2D images (block 410 of FIG. 4 and/or block 510 of FIG. 5). The identification module 1616 is for identifying respective 2D positions of one or more features in the 2D images (block 420 of FIG. 4 and/or block 520 of FIG. 5). The generating module 1620 is for generating a 3D representation of the object (block 530 of FIG. 5). The determining module 1624 is for determining a 3D angular orientation of the 3D representation of the object, as described with respect to block 540 of FIG. 5, and/or block 430 of FIG. 4. The modules 1612, 1616, 1620, and 1624 may perform other corresponding operations and methods disclosed herein.

Various embodiments presented herein have described improved methods for generating 3D images based on 2D images. Specifically, solutions to improve the 3D representation of the object by determining the direction of orientation of the object, such as, for example, the direction that a face is looking as well as selecting 2D images for use based on proper feature state, such as, for example, the eyes of a person being open. Although the embodiments described herein have been in the context of a mobile camera, these techniques may be applied to other imaging systems such as security cameras, medical imaging, etc.

Further Definitions

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluеRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. A method for processing Two-Dimensional, 2D, images to create Three-Dimensional, 3D, images, the method comprising:

receiving, by a processor, a plurality of 2D images of an object;

identifying, by the processor, respective 2D positions of one or more features in each of the plurality of 2D images;

generating, by the processor, a 3D representation of the object, based on the respective 2D positions of the one or more features in each of the plurality of 2D images;

determining, by the processor, a 3D angular orientation of the 3D representation of the object based on relative positions of the one or more features in the 3D representation of the object;

determining, by the processor, respective 2D angular orientations of the object in each of the plurality of 2D images;

ranking, by the processor, the plurality of 2D images based on the respective 2D angular orientations;

selecting, by the processor, a 2D image out of the plurality of 2D images, based on the ranking the plurality of 2D images; and generating, by the processor, a texture for the 3D representation of the object based on the 2D image that was selected, wherein the texture of the 3D image comprises features that are aligned with one another.

2. The method of claim 1, wherein the determining respective 2D angular orientations of the object in each of the plurality of 2D images comprises:

determining, by the processor, the respective 2D angular orientations of the object based on the respective 2D positions of the one or more features in each of the plurality of 2D images.

3. The method of claim 2, wherein the determining respective 2D angular orientations of the object in each of the plurality of 2D images further comprises:

determining, by the processor, the respective 2D angular orientations of the object based on identification of the object based on at least two of the one or more features in one or more of the plurality of 2D images.

4. The method of claim 1, wherein the object comprises a face of a person, wherein a first feature of the one or more features comprises a first eye of the person, wherein a second feature of the one or more features comprises a second eye of the person, and wherein the selecting the 2D image out of the plurality of 2D images comprises:

selecting, by the processor, the 2D image such that both the first eye and the second eye are in an open position.

5. The method of claim 4, wherein the generating the texture of the 3D representation of the object comprises the first eye and the second eye looking in a same direction based on a single one of the plurality of 2D images that comprises the 2D image that was selected.

6. The method of claim 1, wherein the ranking the plurality of 2D images based on the respective 2D angular orientations comprises:

ranking, by the processor, the plurality of 2D images in an order based on the respective 2D angular orientations, wherein a first 2D image comprises the respective 2D angular orientation being a substantially perpendicular view of the object and a last 2D image comprises the respective 2D angular orientation being offset from the substantially perpendicular view of the object.

7. The method of claim 6, further comprising:

determining two or more 2D images of the plurality of 2D images that have respective 2D angular orientations that are substantially perpendicular views of the object; and generating, by the processor, the texture of the 3D image, based on the two or more 2D images.

8. The method of claim 1, wherein the texture comprises one or more of shading or coloring based on the 2D image out of the plurality of 2D images that was selected.

9. The method of claim 1, wherein the generating the 3D representation of the object comprises:

generating, by the processor, the 3D representation of the object based on image capture positional information associated with each of the 2D images.

10. The method of claim 1, wherein the determining the 3D angular orientation of the 3D representation of the object comprises:

determining, by the processor, a cross product of two vectors; and determining, by the processor, the 3D angular orientation of the 3D representation of the object based on the cross product of the two vectors, wherein a first vector of the two vectors comprises a difference between a first feature point 3D coordinate of a first feature of the one or more features in the 3D representation of the object and a second feature point 3D coordinate of a second feature of the one or more features in the 3D representation of the object, and wherein a second vector of the two vectors comprises a difference between the first feature point 3D coordinate of the first feature of the one or more features in the 3D representation of the object and a third feature point 3D coordinate of a third feature of the one or more features in the 3D representation of the object.

11. The method of 10, wherein the determining the 3D angular orientation of the 3D representation of the object based on the cross product of the two vectors further comprises:

determining, by the processor, a plane that comprises a midpoint between the first feature and the second feature;

determining, by the processor, a normal vector to the plane; and applying, by the processor, a tilt to the cross product of the two vectors by rotating around the normal vector.

12. A computer program product for operating an image capturing system, the computer program product comprising a non-transitory computer readable storage medium having computer readable program code embodied in the medium that when executed by a processor causes the processor to perform the method of claim 1.

13. An image processing system for processing images, the image processing system comprising:

a processor; and a memory coupled to the processor and storing computer readable program code that when executed by the processor causes the processor to perform operations comprising:

receiving a plurality of 2D images of an object;

identifying respective 2D positions of one or more features in each of the plurality of 2D images;

generating a 3D representation of the object, based on the respective 2D positions of the one or more features in each of the plurality of 2D images; and determining a 3D angular orientation of the 3D representation of the object based on relative positions of the one or more features in the 3D representation of the object;

determining respective 2D angular orientations of the object in each of the plurality of 2D images;

ranking the plurality of 2D images based on the respective 2D angular orientations;

selecting a 2D image out of the plurality of 2D images, based on the ranking the plurality of 2D images; and generating a texture of the 3D representation of the object based on the 2D image that was selected, wherein the texture of the 3D image comprises features that are aligned with one another.

14. The image processing system of claim 13, wherein the ranking the plurality of 2D images based on the respective 2D angular orientations comprises:

ranking the plurality of 2D images in an order based on the respective 2D angular orientations, wherein a first 2D image comprises the respective 2D angular orientation being a substantially perpendicular view of the object and a last 2D image comprises the respective 2D angular orientation being offset from the substantially perpendicular view of the object.

15. The image processing system of claim 14, wherein the ranking the plurality of 2D images based on the respective 2D angular orientations further comprises:

determining two or more 2D images of the plurality of 2D images that have respective 2D angular orientations that are substantially perpendicular views of the object; and generating, by the processor, the texture of the 3D image, based on the two or more 2D images.

16. The image processing system of claim 13, wherein the texture comprises one or more of shading or coloring based on the 2D image out of the plurality of 2D images that was selected.

17. The image processing system of claim 13, wherein the determining the 3D angular orientation of the 3D representation of the object comprises:

determining a cross product of two vectors; and determining the 3D angular orientation of the 3D representation of the object based on the cross product of the two vectors, wherein a first vector of the two vectors comprises a difference between a first feature point 3D coordinate of a first feature of the one or more features in the 3D representation of the object and a second feature point 3D coordinate of a second feature of the one or more features in the 3D representation of the object, and wherein a second vector of the two vectors comprises a difference between the first feature point 3D coordinate of the first feature of the one or more features in the 3D representation of the object and a third feature point 3D coordinate of a third feature of the one or more features in the 3D representation of the object.

18. The image processing system of claim 17, wherein the determining the 3D angular orientation of the 3D representation of the object based on the cross product of the two vectors further comprises:

determining a plane that comprises a midpoint between the first feature and the second feature;

determining a normal vector to the plane; and applying a tilt to the cross product of the two vectors by rotating around the normal vector.

\* \* \* \* \*